(12) United States Patent
Barenbrug

(10) Patent No.: US 11,553,167 B2
(45) Date of Patent: Jan. 10, 2023

(54) ASSIGNING NEW NUMBERS TO DISPLAY ELEMENTS OF AN AUTOSTEREOSCOPIC DISPLAY

(71) Applicant: ULTRA-D COÖPERATIEF U.A., Eindhoven (NL)

(72) Inventor: Bart Gerard Bernard Barenbrug, Eindhoven (NL)

(73) Assignee: ULTRA-D COÖPERATIEF U.A., Eindhoven (NL)

( * ) Notice: Subject to any disclaimer, the term of this patent is extended or adjusted under 35 U.S.C. 154(b) by 0 days.

(21) Appl. No.: 17/425,507

(22) PCT Filed: Jan. 21, 2020

(86) PCT No.: PCT/EP2020/051386
§ 371 (c)(1),
(2) Date: Jul. 23, 2021

(87) PCT Pub. No.: WO2020/152149
PCT Pub. Date: Jul. 30, 2020

(65) Prior Publication Data
US 2022/0103796 A1    Mar. 31, 2022

(30) Foreign Application Priority Data
Jan. 24, 2019  (EP) .................................... 19153465

(51) Int. Cl.
*H04N 13/111*    (2018.01)
*H04N 13/305*    (2018.01)

(52) U.S. Cl.
CPC ......... *H04N 13/111* (2018.05); *H04N 13/305* (2018.05)

(58) Field of Classification Search
CPC ........................... H04N 13/111; H04N 13/305
(Continued)

(56) References Cited

U.S. PATENT DOCUMENTS

| 2002/0011969 A1 | 1/2002 | Lipton et al. |
| 2005/0059487 A1 | 3/2005 | Wilder et al. |

(Continued)

FOREIGN PATENT DOCUMENTS

| EP | 2 490 451 | 8/2012 |
| JP | 2014-71455 | 4/2014 |

(Continued)

OTHER PUBLICATIONS

International Search Report for PCT/EP2020/051386 dated Mar. 27, 2020, 3 pages.

(Continued)

*Primary Examiner* — Tung T Vo
(74) *Attorney, Agent, or Firm* — Nixon & Vanderhye P.C.

(57) ABSTRACT

A processor system and computer-implemented method are provided for assigning view numbers to display elements of an autostereoscopic display for use in interleaving image data of different viewpoints of a scene on the basis of said assigned view numbers. The assignment is performed in an efficient yet accurate manner and may be easily adapted to different optical designs of such autostereoscopic displays, for example, in terms of pitch and/or slant of the optical elements used in such autostereoscopic displays, or to different sub-pixel layouts of the display panel.

15 Claims, 5 Drawing Sheets

(58) Field of Classification Search
USPC .......................................................... 348/51
See application file for complete search history.

(56) References Cited

U.S. PATENT DOCUMENTS

| | | | |
|---|---|---|---|
| 2005/0122395 | A1 | 6/2005 | Lipton et al. |
| 2006/0012878 | A1 | 1/2006 | Lipton et al. |
| 2006/0279580 | A1 | 12/2006 | Akka et al. |
| 2007/0097502 | A1 | 5/2007 | Lipton et al. |
| 2007/0182738 | A1 | 8/2007 | Feldman et al. |
| 2008/0204550 | A1 | 8/2008 | De Zwart et al. |
| 2012/0062991 | A1* | 3/2012 | Krijn .................. H04N 13/312 359/463 |
| 2012/0092763 | A1 | 4/2012 | Song |
| 2014/0002897 | A1 | 1/2014 | Krijn et al. |
| 2014/0340746 | A1 | 11/2014 | Watanabe et al. |
| 2015/0281682 | A1* | 10/2015 | Van Der Horst .... H04N 13/373 348/59 |

FOREIGN PATENT DOCUMENTS

| | | |
|---|---|---|
| JP | 2014-66539 | 5/2014 |
| JP | 2014-511501 | 5/2014 |
| JP | 2017-510824 | 4/2017 |
| WO | WO 99/05559 | 2/1999 |
| WO | 2006/077506 | 7/2006 |
| WO | 2007/043988 | 4/2007 |
| WO | 2015/091014 | 6/2015 |
| WO | WO 2016/152217 | 9/2016 |

OTHER PUBLICATIONS

Written Opinion of the ISA for PCT/EP2020/051386 dated Mar. 27, 2020, 7 pages.

* cited by examiner

| 0 | 14492 | 28984 | 43476 | 57968 | 7246 | 21738 | 36230 | 50722 | 0 | 14492 |
|---|---|---|---|---|---|---|---|---|---|---|
| 7246 | 21738 | 36230 | 50722 | 0 | 14492 | 28984 | 43476 | 57968 | 17246 | 21738 |
| 14492 | 28984 | 43476 | 57968 | 7246 | 21738 | 36230 | 50722 | 0 | 14492 | 28984 |

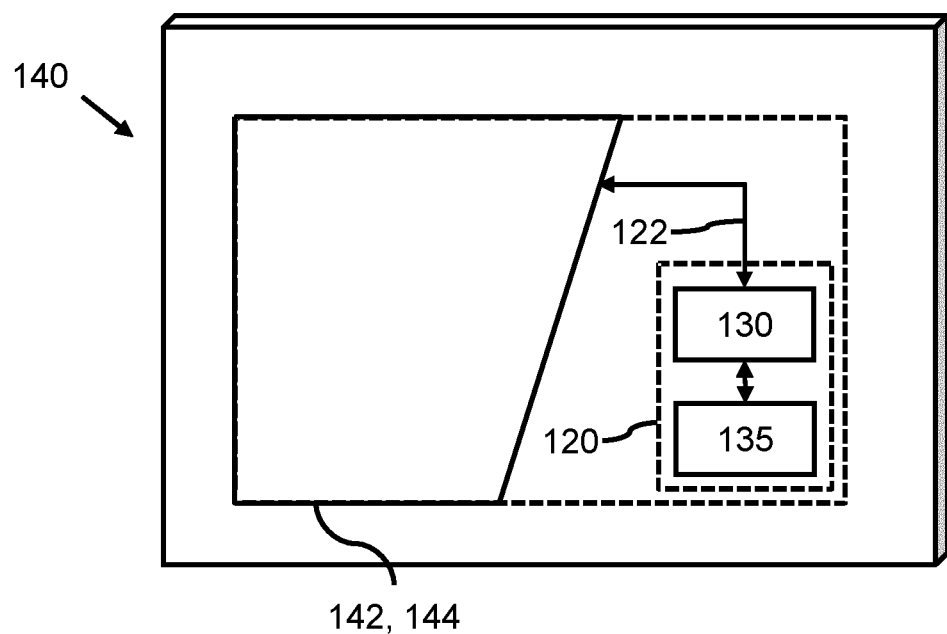
Fig. 4
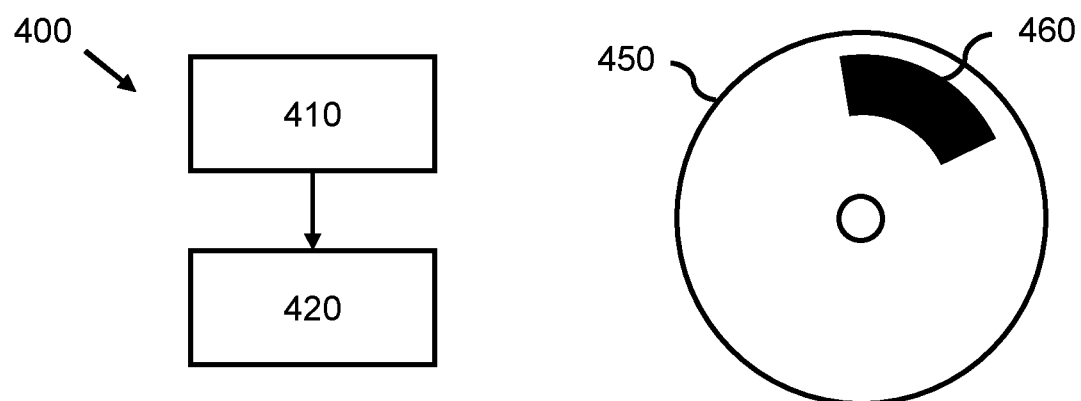
Fig. 5
Fig. 6

ASSIGNING NEW NUMBERS TO DISPLAY ELEMENTS OF AN AUTOSTEREOSCOPIC DISPLAY

This application is the U.S. national phase of International Application No. PCT/EP2020/051386 filed Jan. 21, 2020 which designated the U.S. and claims priority to EP Patent Application No. 19153465.0 filed Jan. 24, 2019, the entire contents of each of which are hereby incorporated by reference.

FIELD OF THE INVENTION

The invention relates to a computer-implemented method and a processor system for assigning view numbers to display elements of an autostereoscopic display. The invention further relates to a computer readable medium comprising instructions arranged to cause a processor system to perform the computer-implemented method.

BACKGROUND ART

Increasingly, display devices such as televisions, digital photo frames, tablets and smartphones comprise 3D displays to provide a user with a perception of depth when viewing content on such a device, for example for in home or portable entertainment, medical imaging or computer-aided design (CAD). For that purpose, such 3D display devices may, either by themselves or together with glasses worn by the user, provide the user with different images in each eye to provide the user with a perception of depth based on stereoscopy, i.e., a stereoscopic perception of depth.

3D display devices typically use content which contains depth information in order to establish the content on screen as having a degree of depth. The depth information may be provided implicitly in the content. For example, in the case of so-termed stereoscopic content, the depth information is provided by the differences between a left and a right image signal of the stereo content. Together, the left and right image signal thus constitute a stereoscopic 3D image signal. The depth information may also be provided explicitly in the content. For example, in content encoded in the so-termed image+depth format, the depth information is provided by a 2D depth signal comprising depth values which are indicative of distances that objects within the 2D image signal have towards a camera or viewer. Instead of depth values, also disparity values may be used, e.g., the 2D depth signal may be a 2D disparity signal, or in general, a 2D depth-related signal. Techniques are known to generate a 2D depth-related signal from a stereo 3D image signal, e.g., for view synthesis for autostereoscopic displays. In general, the data representing content containing depth information is in the following also simply referred to as '3D image data'.

Autostereoscopic displays provide stereoscopic perception of depth without needing the viewer to wear polarized, color-filter-based or shutter-based glasses. For that purpose, optical components are used, such as lenticular lens arrays (or more general lenticular or barrier means), which enable the display to emit a viewing cone from each given point on the 3D display, the viewing cone comprising at least a left view and a right view of a scene. This enables the viewer to see a different image with each eye when positioned accordingly within the viewing cone. Certain types of autostereoscopic displays, sometimes specifically referred to as 'auto-multiscopic' displays, provide a series of views of a scene represented by the 3D image data to a viewer in what is typically referred to as a viewing cone. This allows the viewer to assume multiple positions in the viewing cone, e.g., to experience experiencing motion parallax while still obtaining a stereoscopic perception of the scene. Some displays may emit such series of views in each of a series of repeated viewing cones.

Examples of such autostereoscopic displays are described in a paper by C. van Berkel et al. entitled "Multiview 3D—LCD" published in SPIE Proceedings Vol. 2653, 1996, pages 32 to 39 and in GB-A-2196166. In these examples the autostereoscopic display comprises a matrix LC (liquid crystal) display panel which has rows and columns of pixels (display elements) and which acts as a spatial light modulator to modulate light from a light source. The display panel may be of the kind used in other display applications, for example computer display screens for presenting display information in two-dimensional form. A lenticular sheet, for example in the form of a molded or machined sheet of polymer material, may overlay the output side of the display panel with its lenticular elements, comprising (semi) cylindrical lens elements, extending in the column direction with each lenticular element being associated with a respective group of two, or more, adjacent columns of display elements and extending in a plane that runs parallel with the display element columns.

U.S. Pat. No. 6,064,424 also describes an example of an autostereoscopic display with an array of parallel lenticular elements overlying the display, in which the lenticular elements are slanted with respect to the display pixel columns. It is said that the reduction in display resolution experienced in such apparatus, particularly in the case of a multi-view type display, is shared between both horizontal and vertical resolution.

To display content on an autostereoscopic display having an array of lenticular elements, an output image may be generated by the autostereoscopic display or a device connected thereto on the basis of the 3D image data. This may involve a 'interleaving', 'weaving' or 'interdigitation' step in which it is determined for each display element of the display which image data from which view is to be displayed by the display element, with the output image then being generated by selecting the image data from the corresponding view for display by the respective display element. Here, the term 'display element' may include pixels but also sub-pixels. Such 'interleaving', 'weaving' or 'interdigitation' is in the following simply referred to as 'interleaving'.

For example, the aforementioned U.S. Pat. No. 6,064,424 describes that the individually operable display elements of the display are driven in an appropriate manner such that a narrow slice of a 2D image is displayed by selected display elements under an associated lenticule. The display produced by the panel comprises six interleaved 2D sub-images constituted by the outputs from respective display elements. Each lenticule 16 provides six output beams from the associated underlying display elements with view-numbers 1 to 6 respectively whose optical axes are in mutually different directions and angularly spread around the longitudinal axis of the lenticule.

In general, such interleaving is also known from other publications, for example from U.S. Pat. No. 7,616,227 which describes a system and method for interdigitating multiple perspective views in a stereoscopic image viewing system, and from U.S. Pat. No. 7,375,886, which describes a method and apparatus for optimizing viewing distance for a stereogram system in which optimum pitch values are stored in a table for specified viewing distances and an interdigitation program then acts on the table values and creates a mapping of interdigitated views for each viewing distance.

WO 2015/091014 describes characterizing a lenticular lens sheet using a pitch and slant, and to determine a phase for the discrete positions of display elements with respect to the periodic lenticular lens based on the pitch and slant.

SUMMARY OF THE INVENTION

One of the objects of the invention is to obtain a computer-implemented method and processor system for assigning view numbers to display elements of an autostereoscopic display in an efficient yet accurate manner. The view numbers which are assigned by the method or system may then be used for interleaving image data of different viewpoints of a scene on the basis of the assigned view numbers.

The following measures relate to an autostereoscopic display comprising:
  a display panel comprising an array of display elements; and
  an array of elongated optical elements for redirecting light emitted by the display elements in mutually different directions, the optical elements being arranged substantially in parallel at a pitch distance p and oriented with their main longitudinal axis at a slant s to a column direction of the array of display elements.

Such autostereoscopic displays are known per se. For example, as light redirecting optical elements, a lenticular lens array or a barrier-type array may be used.

A first aspect of the invention provides a computer-implemented method of assigning view numbers to display elements of an autostereoscopic display for use in interleaving image data of different viewpoints of a scene on the basis of said assigned view numbers. The method comprises:
  determining a phase for a respective display element to be used in the assignment of the view number, wherein the phase is representative of a relative horizontal position of the respective display element with respect to an optical element redirecting the light emitted by the respective display element and is thereby indicative of a direction in which the light is redirected, wherein the phase is determined as a delta with respect to the phase of a preceding display element at a horizontal position x and a vertical position y in the array of display elements in accordance with:

phase(x+1,y)=(phase(x,y)+h)% t phase(x,y+1)=(phase(x,y)+v)% t wherein h represents a horizontal delta in phase per display element, wherein v represents a vertical delta in phase per display element, wherein t represents a total number of phases and wherein % is a functional representation of a modulo operation, wherein values of h, v and t are selected as integer values which approximate the pitch distance p and the slant s in accordance with $$p \approx \left|\frac{t}{h}\right| \text{ and } s \approx \frac{v}{h}$$

so that the approximation error in the phase over the width and height of the array of display elements accumulates to less than the pitch distance p; and determining the view number from said determined phase based on a number of most significant digits of a numerical representation of the phase.

A further aspect of the invention provides a computer readable medium comprising transitory or non-transitory data representing instructions for a processor system to perform the method.

A further aspect of the invention provides a processor system for assigning view numbers to display elements of an autostereoscopic display for use in interleaving image data of different viewpoints of a scene on the basis of said assigned view numbers. The processor system comprises:
  a memory comprising instruction data representing a set of instructions;
  a processor configured to communicate with the memory and to execute the set of instructions, wherein the set of instructions, when executed by the processor, cause the processor to determine a phase for a respective display element to be used in the assignment of the view number, wherein the phase is representative of a relative horizontal position of the respective display element with respect to an optical element redirecting the light emitted by the respective display element and is thereby indicative of a direction in which the light is redirected, wherein the phase is determined as a delta with respect to the phase of a preceding display element at a horizontal position x and a vertical position y in the array of display elements in accordance with:

phase(x+1,y)=(phase(x,y)+h)% t phase(x,y+1)=(phase(x,y)+v)% t wherein h represents a horizontal delta in phase per display element, wherein v represents a vertical delta in phase per display element, wherein t represents a total number of phases and wherein % is a functional representation of a modulo operation, wherein values of h, v and t are selected as integer values which approximate the pitch distance p and the slant s in accordance with $$p \approx \left|\frac{t}{h}\right| \text{ and } s \approx \frac{v}{h}$$

so that the approximation error in the phase over the width and height of the array of display elements accumulates to less than the pitch distance p; and
  determine the view number from said determined phase based on a number of most significant digits of a numerical representation of the phase.

The above measures involve assigning view numbers to display elements of an autostereoscopic display for use in interleaving image data of different viewpoints of a scene on the basis of said assigned view numbers. Such type of interleaving is known per se, e.g., as indicated in the background section, and generally involves assigning a view number to each respective display elements and then suitably interleaving the image data of the different views to ensure that the light emitted by the display in the different angular directions corresponds to the different views.

The assigning of view numbers to display elements typically results in a 'semi-regular' spatial pattern for each view number which may be used to sub-sample the image data of the respective view, e.g., if the image data is available at a higher resolution, to interpolate the image data, e.g., if the image data is sampled at a different sampling grid, or to selectively generate the image data, e.g., by known view rendering or view synthesis techniques. In general, once view numbers have been assigned to display elements, it is known how to suitably generate an interleaved output image.

Such interleaving normally takes into account the type of lenticular lens array and its configuration in the display, which may include the slant of the lenticular lens array with respect to the display panel and the pitch distance between lenticular elements. The slant may be expressed as or in relation to the angle of the main longitudinal axis of the lenticular elements to the column direction of the array of display elements but may also be expressed differently, e.g., in relation to the row direction of the array of display elements. The slant may be expressed in degrees, radians, etc., but is commonly expressed by reference to triangle trigonometry, e.g., by indicating the hypotenuse of a triangle. For example, ⅙ may refer to the hypotenuse from display element (n, m) to display element (n+1, m+6) and the slant angle corresponding to arctan ⅙≈10 degrees in case the display elements have a 1:1 aspect ratio in horizontal and vertical direction. The pitch distance, or simply 'pitch', may be expressed in as an absolute number, e.g., in millimeters, but is commonly expressed in relation to the display panel, e.g., by a number of display elements, e.g., a number of pixels. For example, the pitch may be 1½ pixels. The pitch between optical elements may be measured horizontally but also in a different direction, e.g., in a direction perpendicular to the slanted elongated optical elements.

It is noted that in the above and following, the term 'display element' typically refers to a pixel but may also include a group of pixels or a sub-pixel.

The above measures provide an efficient yet accurate way of determining the view number of each display element, namely by assigning a phase to each display element. Here, the phase represents the relative horizontal position of the respective display element with respect to an optical element which redirects the light emitted by the respective display element. As such, the phase is indicative of a direction in which the light is redirected, and ultimately indicative of the view number which is to be assigned to the particular display element. Assigning the phase may involve calculating the phase for a display element located at a position (x, y) in the array of display elements on the basis of the pitch p and slant s of the array of optical elements. For example, the phase may be calculated as x/p+y*s, which calculation may involve a division per display element and a numerical representation as a floating-point number.

Instead of the above-described calculations, the above measures introduce a [h,v,t] notation which defines the phase of a display element relative to the phase of a preceding display element, namely phase(x+1, y)=(phase(x, y)+h) % t and phase(x, y+1)=(phase(x, y)+v) % t, where x represents a horizontal position in the array of display elements, y represents a vertical position in the array of display elements, h represents a horizontal delta, v represents a vertical delta, t represents the total number of phases and % t is a functional representation of a modulo operation, e.g., a 'true' modulo or a check against 0 and t which is then possibly followed by an increment/decrement by t. The use of such a [h,v,t] approach involves translating the values of the pitch p and the slant s into the horizontal phase offset h and the vertical phase offset v, for example on the basis of p=|t/h| and s=v/h. This calculation may be performed 'once' for a particular type and/or a particular configuration of the autostereoscopic display, instead of having to be performed for each display element.

Disadvantageously, the assigning of phases in the above-described relative manner based on the [h,v,t] approach may require a high numerical accuracy for calculating and storing the values of h, v, t and the phase. If only a limited numerical accuracy is used, e.g., an integer representation, only a limited number of different slants and/or pitches may be expressed using the [h,v,t] notation, which may be insufficient in certain situations. For example, due to manufacturing inaccuracies, the actual pitch and/or slant may deviate slightly from their nominal value. Another example is that the process of controlling the rotational position of the lenticular lens array during manufacture of the autostereoscopic display may be slightly inaccurate, leading to a slight deviation from the intended slant. Yet another example is that due to 'view distance adjustment' (also discussed later), a slightly different pitch may be assumed in the view number assignment so as to effect the view distance adjustment.

In the example of [6, 1, 9], the next representable pitch by increment of t is [6, 1, 10], achieving only a step of ⅙ in pitch. Yet another example is that in the above-described assigning of phases, inaccuracies due to the accumulation of rounding errors may occur, which may be particularly relevant for high-resolution display panels, e.g., 4K or 8K or even higher resolution displays having many display elements.

To address the above problem of the usage of [h,v,t], the values of h, v and t may be selected as integer values which approximate the pitch distance p and the slant s in accordance with $$p \approx \left|\frac{t}{h}\right| \text{ and } s \approx \frac{v}{h}$$

so that the accumulated approximation error in the phase over the width and height of the array of display elements is less than the pitch distance p. In other words, an integer representation of h, v and t may be selected such that the values sufficiently approximate the pitch distance p and the slant s, and in particular, such that the accumulated approximation error in the phase over the entire pixel grid is less than the pitch distance p. To enable such comparison, the pitch distance p may be expressed as a phase difference, or in general, the approximation error and the pitch distance p may be expressed as a same type of unit.

The approximation error itself may be expressed with respect to a selection of values of h, v, and t which accurately represents the pitch distance p and the slant s in accordance with $$p \approx \left|\frac{t}{h}\right| \text{ and } s \approx \frac{v}{h}$$

and thereby represents a reference for the earlier mentioned approximation by integer values. Accordingly, the accumulated approximation error may be easily numerically calculated for a particular selection of h, v, and t. The pitch distance p may represent a phase difference between display elements which are associated with a same or similar view in adjacent viewing cones, and may thereby considered to represent the phase difference between adjacent viewing cones. This may be considered as a minimum accuracy for the earlier mentioned approximation by integer values. In some embodiments, the values of h, v and t may be selected so that the accumulated approximation error is less than 75% of the phase difference of the pitch distance p, or less than 50% of the phase difference, or less than 25%, or less than 10%.

The integer values of h, v and t may be calculated in various ways.

For example, the slant s and the pitch distance p may be approximated as rational numbers having a common denominator, with the values of h, v and t then being obtained as, respectively, the value of the common denominator, a rounded multiplication result of multiplying s by h, and a rounded multiplication result of multiplying p by h. Each of the values of h, v, and t may thus be represented by an integer number instead of a floating-point number. This may effectively represent an 'upscaling' of the number of phases, e.g., from 9 to 18 phases or to an even higher number, and a corresponding determination of the values of the horizontal delta h and the vertical delta v in the 'upscaled' domain. Thereby, a phase calculation which uses an integer representation of [h,v,t] may still provide sufficient accuracy in determining the phase of a display element. Another example is that a [1.0, s, p] notation may be used in which s and p are the actual slant and pitch values expressed as floating-point numbers, which may be upscaled by a factor a and then rounded to obtain [a, round(a*s), round(a*p)], which would then correspond to [h, v, t]. In general, the value for t may be selected first, for example based on a desired precision, after which the value of h may be determined as a function of t and h, after which the value of v may be determined as a function of h and s, and as an optional last step, if h and v are deemed to be too large, e.g., requiring the numerical representation of the phase to be able to store very large values, scaling the values of h, v, and t down by a same factor Using the 'upscaled' phase in the above manner, the view number may then be determined from the phase based on a number of most significant digits of the numerical representation of the phase. Here, 'based on' includes the view number being directly determined as a number of most significant digits, e.g., by a zero-fill right-shift operation, but also includes other ways of determining the view number based on the most significant digits, e.g., by using these as an index to a look-up table.

In accordance with the above measures, the view number may be assigned in a computationally efficient manner, for example by iteratively proceeding through the rows and columns of display elements and determining the phase of a respective display element in accordance with the above relative phase relations. Various configurations of lenticular lens arrays may be characterized by the [h,v,t] notation. For example, a display having optics characterized by pitch 1½ and slant ⅙ may be represented by [6, 1, 9], and the pitch 5/3 and slant ⅓ may be represented as [3, 1, 5].

This allows accurate determination of the view number while maintaining a low computational complexity, allowing various values of the slant and/or pitch to be taken into account and/or reducing rounding errors, in particular larger errors caused by the repeated accumulation of smaller rounding errors. The latter may be particularly relevant for higher resolution displays, e.g., the aforementioned 4K or 8K displays.

Optionally, the value of the common denominator or h, the value of v or the value of t may be selected as or near a maximum value of the numerical representation of the phase, for example as 65535 for a 16-bit numerical representation of the phase. Thereby, various pitch and slant configurations may be represented with a relatively high accuracy. In some embodiments, the value of h, the value of v and the value of t may be jointly selected so that a largest one of said values is at or near the maximum value of the numerical representation of the phase. In some embodiments, the value of h, the value of v and the value of t may be jointly selected so that a largest one of said values is near the maximum value of the numerical representation of the phase, while allocating a headroom with respect to the maximum value for allowing adjustments of t. In other words, the value of h, the value of v and the value of t may be selected so that a largest one of said values plus a headroom value equals the maximum value of the numerical representation of the phase, wherein the headroom value may represent an allocation of a headroom with respect the maximal value for allowing adjustments of t. This enables so-called view distance adjustment, by which the value of t may be adjusted to adjust for the view distance of a viewer to the autostereoscopic display. The headroom may for example be selected to allow the view distance adjustment to be performed within a particular range. For example, if the view distance adjustment may maximally cause an increase in a nominal value of t by 321, and if the value of t is the largest value, the value of t may be selected to be 65535−321=65214. The term 'near' may thus refer to a maximum within the numerical representation of the phase subject to an allocation of headroom for adjustment of t for view distance adjustment.

Optionally, the display elements may be pixels or group of pixels, each pixel may comprise a number of sub-pixels, and a sub-pixel phase may be assigned to a respective sub-pixel by adding an offset to, or subtracting an offset from, the determined phase of the pixel or the group of pixels. As such, the phase may be determined using the [h,v,t] approach for each pixel or group of pixels, with the phase of a sub-pixel then being determined by adding an offset to, or subtracting an offset from, the determined phase. For example, the determined pixel phase may be assigned to a selected geometric position within the pixel's surface, and the sub-pixel phases may be determined by adding or subtracting respective offsets which represent the difference in their geometric position with respect to the selected geometric position. Such adding or subtracting of offsets may be performed in an iterative manner, e.g., by repeatedly adding or subtracting an offset and thereby proceeding through the sub-pixels. It is noted that since any rounding error in the sub-pixel phase offsets may, if at all, only accumulate across the few sub-pixels, the sub-pixel phase offset may be represented in reduced precision, for example in the same number of (most significant) bits of the phase which are used to determine the view number. As will also be elucidated in the detailed description, such an approach may also provide more flexibility in terms of supporting different sub-pixel arrangements (layouts).

Optionally, determining the view number from the determined phase may comprise using the number of most significant digits of the numerical representation of the phase as an argument to a function providing a mapping from the determined phase to the view number, such as an index to a look-up table. Such a function may provide flexibility in terms of mapping, as different mapping functions may be defined by way of such a function. In a specific example, such a function may be implemented by loading appropriate values into the look-up table. For example, the look-up table may define stereoscopic regions and pseudoscopic regions in a viewing cone of the autostereoscopic display by comprising, for increasing phases, a stereoscopic sequence of views in which the view numbers increase and a pseudoscopic sequence of views in which the view numbers decrease. In such and other embodiments, the pseudoscopic sequence of views may consist of a subset of the view numbers of the stereoscopic sequence of views.

Optionally, the look-up table contains integer representations of the view numbers. Optionally, the entries in the look-up table may be interpolated during look-up. For example, if a particular phase is not comprised in the look-up table, the view number may be interpolated as a function of the view numbers of two adjacent phases, for example, using a weighted interpolation in which the weights are determined inversely proportionate with the distance to a respective adjacent phase.

In general, the processor system may be implemented as an integrated circuit, such as a system-on-chip. In general, the autostereoscopic display may comprise the processor system, e.g., as an internal component.

It will be appreciated by those skilled in the art that two or more of the above-mentioned embodiments, implementations, and/or aspects of the invention may be combined in any way deemed useful.

Modifications and variations of the method which correspond to the described modifications and variations of the integrated circuit can be carried out by a person skilled in the art on the basis of the present description.

BRIEF DESCRIPTION OF THE DRAWINGS

These and other aspects of the invention are apparent from and will be elucidated with reference to the embodiments described hereinafter. In the drawings.

FIG. 4 shows the 3D display comprising the processor system;

FIG. 5 shows a method of processing 3D image data; and

FIG. 6 shows a computer readable medium comprising non-transitory data representing instructions for a processor system to perform the method.

Figure 1:
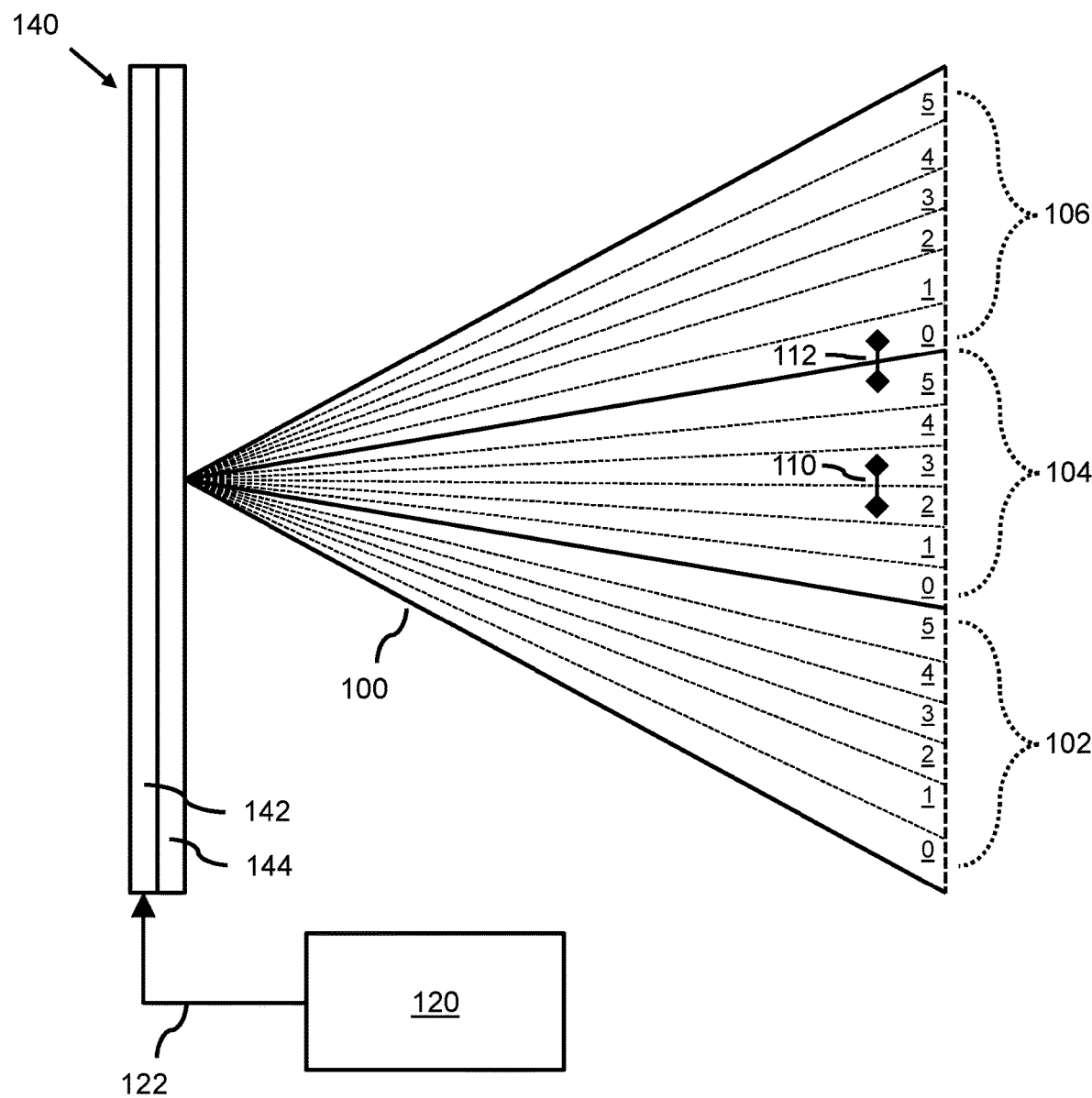
FIG. 1 shows a processor system and a 3D display for adjacently emitting a series of views in each of a series of viewing cones, with the processor system generating and providing an interleaved output image to the 3D display for display.

It should be noted that items which have the same reference numbers in different Figures, have the same structural features and the same functions, or are the same signals. Where the function and/or structure of such an item has been explained, there is no necessity for repeated explanation thereof in the detailed description.

LIST OF REFERENCE AND ABBREVIATIONS

The following list of references and abbreviations is provided for facilitating the interpretation of the drawings and shall not be construed as limiting the claims.

0-5 series of views
100 series of repeated viewing cones
102-106 viewing cones
110 stereoscopic viewing position
112 pseudoscopic viewing position
120 processor system
122 interleaved output image
130 processor
135 memory
140 3D display
142 display panel
144 lenticular lens array
200 array of pixels with subpixels showing assigned phases
210 pixel at pixel position (1,0)
220 pixel at pixel position (0,1)
230 pixel at pixel position (0,0)
260 interleaved image data of views
280 sub-pixels with assigned phases
300 graph showing phase-to-view-number mapping
310 phase
320 view number
330 phase-to-view-number mapping
340 stereoscopic sequence of views
350 pseudoscopic sequence of views
400 method of assigning view numbers
410 determining phase for display element
420 determining view number from determined phase
450 computer readable medium
460 non-transitory data representing instructions

DETAILED DESCRIPTION OF EMBODIMENTS

FIG. 1 shows a processor system 120 which is connected to a 3D display 140 and which may in some embodiments provide an output image, e.g., in the form of display data 122, to the 3D display. As will also be elucidated with reference to FIG. 4, the processor system 120 may be comprised in an external device which is connected to the 3D display 140, such as a set-top box or computer, but may also be comprised in the 3D display itself or in a device which includes the 3D display, e.g., a television, tablet or smartphone. The 3D display 140 is an autostereoscopic 3D display for enabling stereoscopic viewing of content displayed thereon without a need for the user to wear glasses. For that purpose, the 3D display 140 is shown to comprise a light generating portion 142 which is typically comprised of an array of light emitting or light modulating elements. Such type of elements are also referred to as 'display elements'. For example, the light generating portion 142 may be formed by a Liquid Crystal Display (LCD) panel and a backlight, as is known from the technical field of displays.

The 3D display 140 is further shown to comprise optical means 144 for redirecting light generated by the light generating portion 142 into different directions. Although not shown explicitly in FIG. 1, the optical means 144 may comprise or consist of an array of elongated optical elements, such as lenticular elements or parallax barrier-type elements. The light generating portion 142 may be suitably arranged and cooperative with the optical means 144 such that a series of views 0-5 are emitted from the 3D display 140 in the form of a viewing cone 104. The series of views 0-5 may show a series of images. Thus, the viewer will perceive, when viewing one of the series of views 0-5, a respective one of the series of images. The series of images may, in terms of image content, correspond to a camera facing a scene and moving from left to right in front of, and relative to, said scene. As such, a viewer positioned at viewing position 110 within the viewing cone 104 may perceive two different ones 2, 3 of the series of views 0-5 and may thereby obtain stereoscopic viewing of said scene. Conversely, a viewer positioned at viewing position 112 may perceive so-called pseudoscopic viewing, which will be further explained with reference to FIG. 3.

It is noted that 3D displays of the above configuration, and the manner of processing a series of images for display as the series of views 104, are in itself known. For example, U.S. Pat. No. 6,064,424 discloses an autostereoscopic display apparatus having lenticular elements as optical means and discusses the relationship between display elements and the lenticular elements. U.S. Pat. No. 6,064,424 also discloses that the elongated optical elements may be arranged substantially in parallel at a pitch distance p and oriented with their main longitudinal axis at a slant angle s to a column direction of the array of display elements. Such and other parameters characterizing the elongated optical elements are in the following also referred to as 'optical designs'.

It is desirable for a processor system generating interleaved display data for an autostereoscopic display to support a variety of such optical designs. The variety in optical designs may increase with an increase in prevalence of autostereoscopic displays. For example, it may be desirable to support a pitch 1½ and slant ⅙ design next to a pitch 5/3 and slant ⅓ design for a vertically striped pixel grid, or optical designs for other pixels grids such as a horizontally striped pixel grid (when for example using a vertically striped pixel grid panel in portrait mode), or other pixel grids such as Pentile RGBW (https://en.wikipedia.org/wiki/PenTile matrix family#PenTile RGBW).

The optical designs may be adapted to adjust to application requirements. For example, a larger pitch may be used to 'trade-off' more of the display panel resolution for depth. Moreover, in practice, deviations from the theoretical design may occur, as a result from, e.g., manufacturing tolerances. As a result, the actual pitch may deviate from its theoretically designed value, for example due to the aforementioned manufacturing tolerances, or the wish for user-controlled viewing distance adjustment. Another example is that the actual slant may deviate due to there being less space for alignment with the display elements due to the ever-smaller bezels of displays.

It may thus be desirable to be able to support a variety of different pitch and slant values, and/or different pixel grids, while still using an efficient implementation. The latter may imply using integer-based numerical representations of parameters and variables, rather than, e.g., floating-point based numerical representations.

The following describes, by way of example, the interleaving of image data by determining the phase for each pixel and then sub-pixel, which may take so-called 'view distance correction' into account, and then assigning a view number to each sub-pixel based on the phase, for example, by determining which of a number of views that have been rendered beforehand best corresponds to the determined phase.

Determining the Phase

Figure 2A:
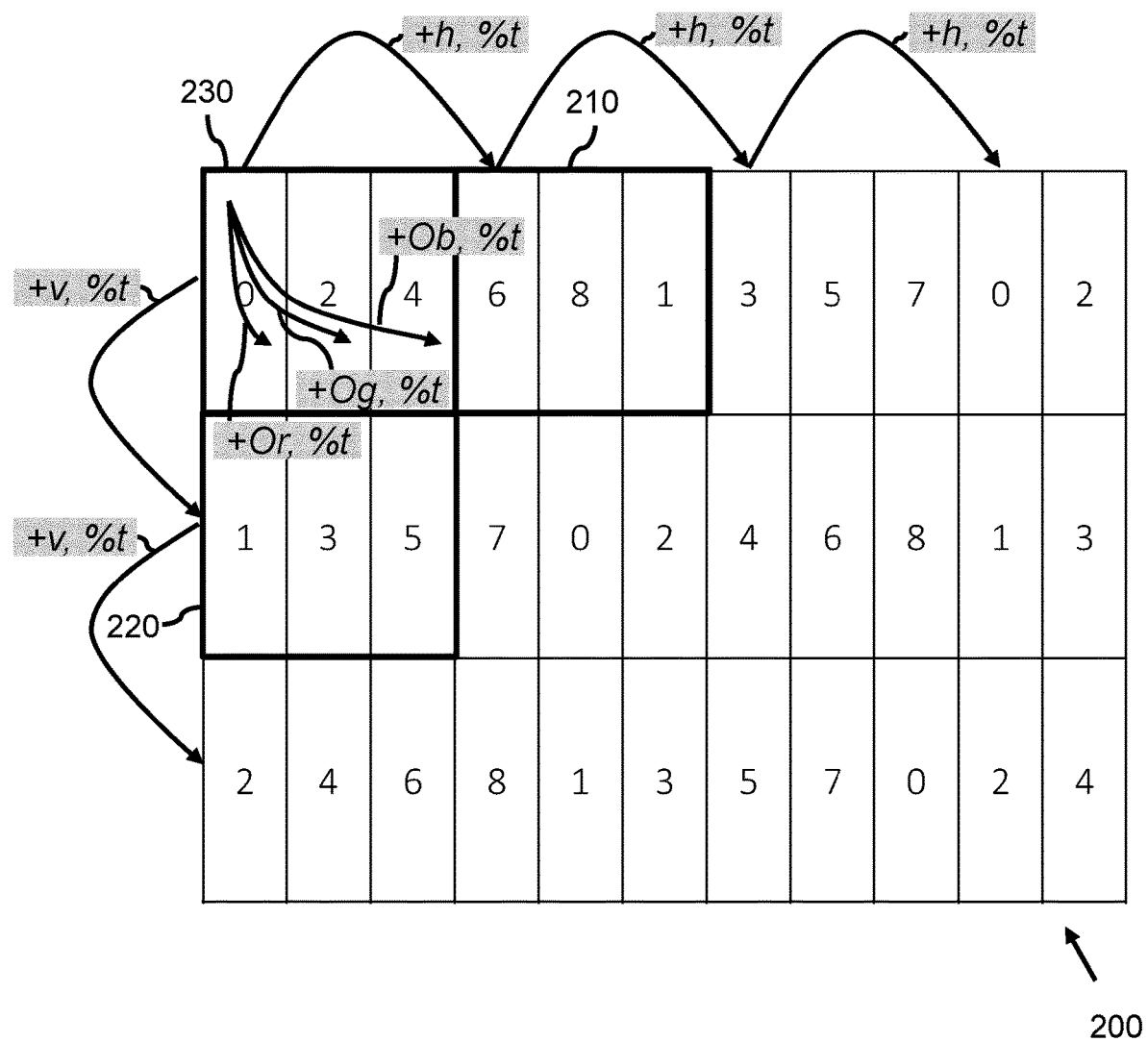
FIG. 2A illustrates the assigning of phases to display elements of the 3D display on the basis of a [h,v,t] approach for a 3D display having 9 assignable phases, e.g., for views or fractional views, pitch distance p of 1½ pixel and slant angles of ⅙.

FIG. 2A illustrates the assigning of phases to display elements of the 3D display on the basis of a [h,v,t] approach for a 3D display having 9 assignable phases, corresponding for example to separate views or fractional views of the 3D display, and the 3D display having a pitch distance p of 1½ and a slant angle s of ⅙. Specifically, FIG. 2A shows a pixel grid 200 in which each pixel consists of three sub-pixels arranged in a vertically striped pixel grid, e.g., a R(ed), G(reen) and B(lue) sub-pixel. In the example of FIG. 2A, a number of pixels 210-230 are explicitly indicated by bounding boxes around their respective sub-pixels while other pixels are not explicitly indicated.

It may be desired to compute a phase for each individual sub-pixel. For that purpose, the following examples first determine the phase of a pixel, henceforth also referred to as pixel phase (or 'pixelPhase') and then assign phases to the pixel's sub-pixels, henceforth also referred to as sub-pixel phases (or 'subpixelPhase'). In alternative embodiments, the determined pixel phase may be simply assigned to all sub-pixels. In other embodiments, it is conceived that the phase is directly determined for each sub-pixel in the manner as described in the following for pixel phases.

Using the [h,v,t] approach, the phase relation in the FIG. 2A example may, from one pixel to the next pixel in a horizontal direction, correspond to:

$$\text{pixelPhase}(x+1,y)=(\text{pixelPhase}(x,y)+6)\%9$$

This relation is visually indicated in FIG. 2A by the arrow labeled '+h, % t' between pixel 230 at position (0, 0) and pixel 210 at position (1, 0), with the value of h being in this example '6' and the value of t being in this example '9'.

Similarly, the phase relation from one pixel to the next pixel in a vertical direction may correspond to:

$$\text{pixelPhase}(x,y+1)=(\text{pixelPhase}(x,y)+1)\%9$$

This relation is visually indicated in FIG. 2A by the arrow labeled '+v, % t' between pixel 230 at position (0, 0) and pixel 220 at position (0, 1), with the value of v being in this example '1' and the value of t being in this example '9'.

Having determined the pixel phase, the phase for the sub-pixels may be computed by adding phase offsets which characterize the sub-pixel layout, for example, for each sub-pixel i: subPixelPhase(x,y,i)=pixelPhase(x,y)+phaseOffset(i).

The sub-pixel phases may be determined by taking their relative geometric position within the pixel's surface area into account, and thereby the relative geometric position with respect to (overlaying) optical elements. For example, the determined pixel phase may be assigned to the upper-left corner of a pixel. In this example, the sub-pixel phase offsets in the pixel grid of FIG. 2A may correspond to h/6+v/2, h/2+v/2 and 5h/6+v/2. However, as also illustrated in FIG. 2A, one may also assign the pixel phase to the center of the left-most sub-pixel. In this example, the sub-pixel phase offsets may be 0, h/3 and 2h/3, or 0, 2 and 4 in the FIG. 2A example. FIG. 2A illustrates the latter example by showing the assigned phase for each of the sub-pixels.

The use of sub-pixel phase offsets allows for the sub-pixel phases to be easily calculated for different sub-pixel grids on the basis of the pixel phase. For example, if the sub-pixels within a pixel would be oriented as horizontal stripes rather than the vertical stripes shown in FIG. 2A (for example when using the panel of FIG. 2A in a portrait configuration) and the pixel phase is assigned to the center of the top-most sub-pixel of each pixel, the sub-pixel phase offsets may be 0, v/3 and 2v/3.

It is noted that the offsets 0, ⅓ and ⅔ (corresponding to the geometrical location of a sub-pixel within a pixel) in the two examples above are in principle independent of the pitch and the slant, and as such characterize the sub-pixel phases in a manner that can easily accommodate varying values for the pitch and the slant.

In some cases, the sub-pixel grid may not be defined by sub-pixel offsets of within a pixel, for example, if the (sub)pixel grid is not an orthogonal grid. In that case, sub-pixel offsets may be defined for a group of pixels which does repeat across the display panel. For example, for a Pentile RGBW sub-pixel grid, the RGBW offsets for the sub-pixels in the even rows may be 0, h/4, h/2 and 3h/4, and h/2, 3h/4, 0 and h/4 for the sub-pixels in the odd rows, respectively. Typically, (sub)pixel grids repeat within 2×2 pixels, so different sub-pixel offsets may be defined for odd and even rows and odd and even columns, thereby enabling a wide range of (sub)pixel grids to be handled in the assignment of sub-pixel phases.

Increased Precision

Referring back to the use of the [h,v,t] approach, in general, a selection of values for [h,v,t] may correspond to an optical design having pitch |t/h| and slant v/h. Accordingly, an optical design having pitch 1½ and slant ⅙ may be expressed by [6, 1, 9], or in other words, as a horizontal delta h of '6' in phase per pixel, a vertical delta offset v of '1' per line of pixels, and a total number of phases t of '9'.

This notation, which combines pitch and slant in a rational representation using the same denominator, may enable the pixel phase to be easily computed in a scanning manner, e.g., by proceeding sequentially through the pixel grid, using:

pixelPhase($x$+1,$y$)=(pixelPhase($x$,$y$)+$h$)% $t$ and pixelPhase($x$,$y$+1)=(pixelPhase($x$,$y$)+$v$)% $t$ The [h,v,t] approach further allows increased precision. For example, [6, 1, 9] may be scaled by a factor 2 to the equivalent [12, 2, 18], which still denotes a pitch 1½ and slant ⅙ configuration. But with 18 phases instead of 9, deviations in pitch may be more accurately represented. Namely, for [6, 1, 9], the next representable pitch by increment of t is [6, 1, 10], resulting in a step of ⅙ in pitch. In contrast, for [12, 2, 18], the next representable pitch is [12, 2, 19], which is a $\frac{1}{12}^{th}$ step in pitch and thus half the step size. By scaling up the representation, finer adjustments can be made.

For example, if the pitch of an optical design turns out to be 1.49963, this pitch may be represented in [h,v,t] as [10000, 1667, 149963] (still with a slant of approximately ⅙), or [h,v,t] as [30000, 5000, 3*149963] to obtain s precisely as ⅙.

Another example is that for a 4K display panel, with a pitch around 1½ and a slant of around ⅙, it may be desirable to represent h, v and t in 16-bit precision, e.g., to prevent accumulation of rounding errors resulting in too large errors in the phase assignments. For even higher resolution display panels, such as 8K display panels, even more precision may be needed as the h/v deltas may be accumulated over longer and more lines. Also, when more resolution is available, it is likely that more of the display panel resolution will be used for depth rather than for sharpness, with this trade-off being known per se, resulting in designs with larger pitches. Also in this case, more precision may be needed, e.g., 18 bits for 8K display panels with a pitch around 4. An unsigned number may be used to represent t, and it may be chosen which of h and v is represented by a signed number to be able to specify both negative and positive slant. For example, it may be preferable to represent h unsigned, since flipping the sign of h also flips the order of the phases in a horizontal direction.

For reasons explained further onwards (see also the sections on view distance adjustment and the phase-to-view mapping), it may be advantageous to scale up the [h,v,t] representation such that the numbers are as large as possible, e.g., within a selected numerical representation. Typically, the 'scaling factor' may be determined by the value of t, since h usually is smaller than t (since pitches smaller than 2 do not lead to enough separation between left and right-eye views for more than 2 views) and v is typically around one sixth of h to properly distribute the horizontal and vertical resolution, and thereby (much) smaller than t. However, in some cases, such as a small pitch and a 45-degree slant, v or h rather than t may determine the scaling factor.

As an example for the accuracy in representing the slant in this manner: scaling up [6, 1, 9] to 16-bit by multiplying by 65535/9 (using integer division) yields [−43686, 7281, 65529]. A 1-off slant, referring to the smallest possible modification of the slant value without changing pitch, namely a change of 1 of v, may then be represented by [15120, 7282, 65529]. Such a [h,v,t] approach would approximately result in an accumulated rounding error of approximately 0.3 in phase (out of 9) over the entire pixel grid of a 4K display panel. Typically, this may be considered to be sufficiently accurate, providing an acceptable order of allowable error. Less accuracy may also be acceptable, but it may be desirable to leave headroom for different optical designs.

The required accuracy of the pitch may be determined by the smallest steps in change in pitch which are to be supported. Such changes in pitch may need to be supported for various reasons, including so-termed view distance adjustment.

View Distance Adjustment

View distance adjustment refers to an accommodation in the assignment of phase, and thereby in the assignment of view numbers, for a particular view distance of a viewer to the display which is different from the nominal view distance of the optical design. Such view distance adjustment may be implemented by slightly adjusting the value of the pitch which is assumed in the phase calculation from a nominal value representing the actual optical design. Typically, such adjustments in pitch are in the permilles-order. To have sufficient steps in adjustability, for example 100 steps, this may result in an increment of t of ¹⁄₁₀₀₀₀ or somewhat smaller. Such increments of t results in an adjusted pitch p in view of the relationship of p=|t/h|. Such increments may be possible in the aforementioned 16-bit numerical representation of t.

To leave sufficient header-room to adjust t upward to change viewing distance, it may be desirable to normalize the [h,v,t] representation to a value that is 65535 minus the maximum addition that may still be applied, so that the representation does not overflow when increasing t. For example, [6,1,9] may be scaled up to [43476, 7246, 65214] to leave a headroom of '321' for view distance adjustment.

Phase-to-View-Number Mapping

Figures 2B, 2C:
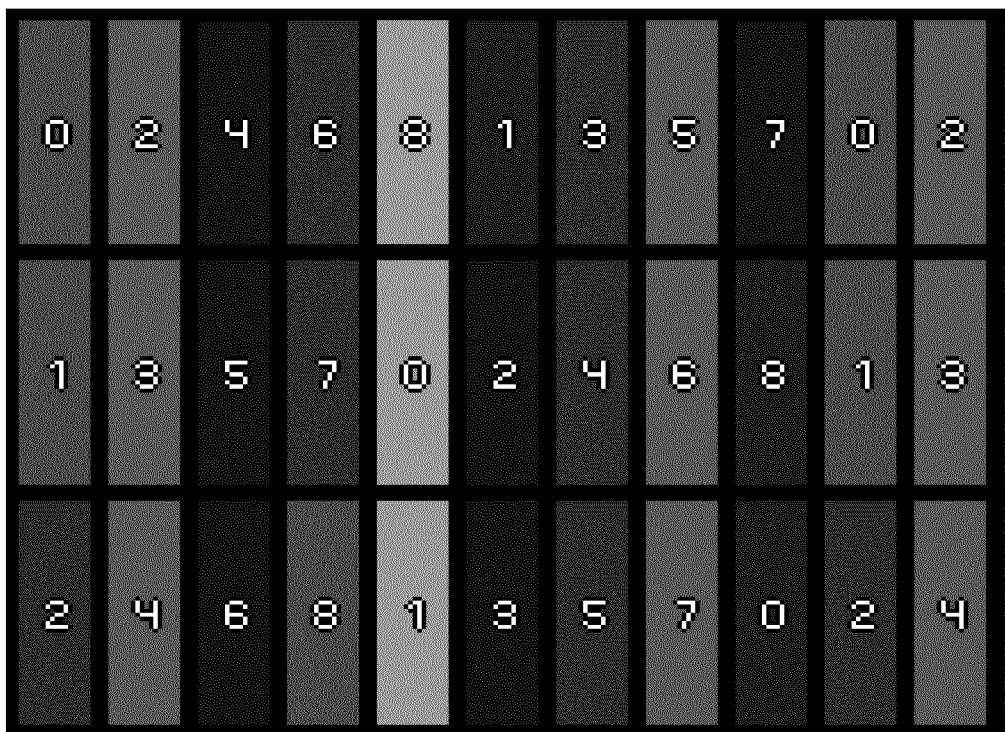
FIG. 2B illustrates the display of interleaved image data of views.
FIG. 2C illustrates the assigning of phases to display elements similar to FIG. 2A but with a higher-accuracy phase representation having 64214 phases.

Having assigned the phase to the pixels and sub-pixels of the pixel grid, view numbers may be assigned based on the phases, which may then be used to interleave the image data of views. FIG. 2B illustrates such display of interleaved image data 260 of views in which sub-pixels are shown having an intensity (and color) which corresponds to that of the assigned image data. FIG. 2B further shows the view numbers which were used for the interleaving, while FIG. 2C shows the (upscaled) phases 280 on the basis of which the view numbers of FIG. 2B were assigned.

It is noted that even though the number of phases may be (potentially vastly) larger than the number of views compared to a situation in which there is a 1:1 relation between phase and view number, it is typically not desired to render or otherwise obtain unique views of the scene for each of these phases. As such, the number of views is typically much lower, and may be determined by factors such as the number of instantiated rendering pipelines, etc. For example, as also shown in FIG. 2A, there may be 9 unique views 0-8 for which image data may be available or may be generated. As such, phases may have to be mapped to a limited set of view numbers.

There are various options and considerations when mapping the determined phase to a view number. For example, one may consider that a large part of a viewing cone is used for stereoscopic viewing. A smaller part, for example a quarter to a third of the viewing cone, may be used for so-called pseudoscopic viewing to reduce artifacts in the transition area between cones. The purposeful generation of a pseudoscopic viewing zone is known per se, for example from WO 2013/102500 A1.

In the example of having 9 phases, one may assign view numbers 0, 1, 2, 3, 4, 5, 6, 4, 2 to the 9 phases to establish both a stereoscopic viewing part (from 0 to 6) and a pseudoscopic viewing part (e.g., 6, 4, 2, 0), thereby assigning 7 unique view numbers to the 9 phases. In the example of an 'upscaled' representation to [12, 2, 18], one may assign view numbers 0, 0, 1, 1, 2, 2, 3, 3, 4, 4, 5, 5, 6, 5, 4, 3, 2, 1 to the 18 phases, thereby yielding a finer view distribution in the pseudoscopic area. However, also this example only assigns 7 unique view numbers. In the [12, 2, 18] example, only even phases are assigned, e.g., based on the horizontal delta h and the vertical delta v being even numbers. As such, the view numbers which are assigned correspond to those of the abovementioned '9 phase' example. The odd phases in the phase-to-view mapping may nevertheless be used, for example for pitch or slant corrections.

Figure 3:
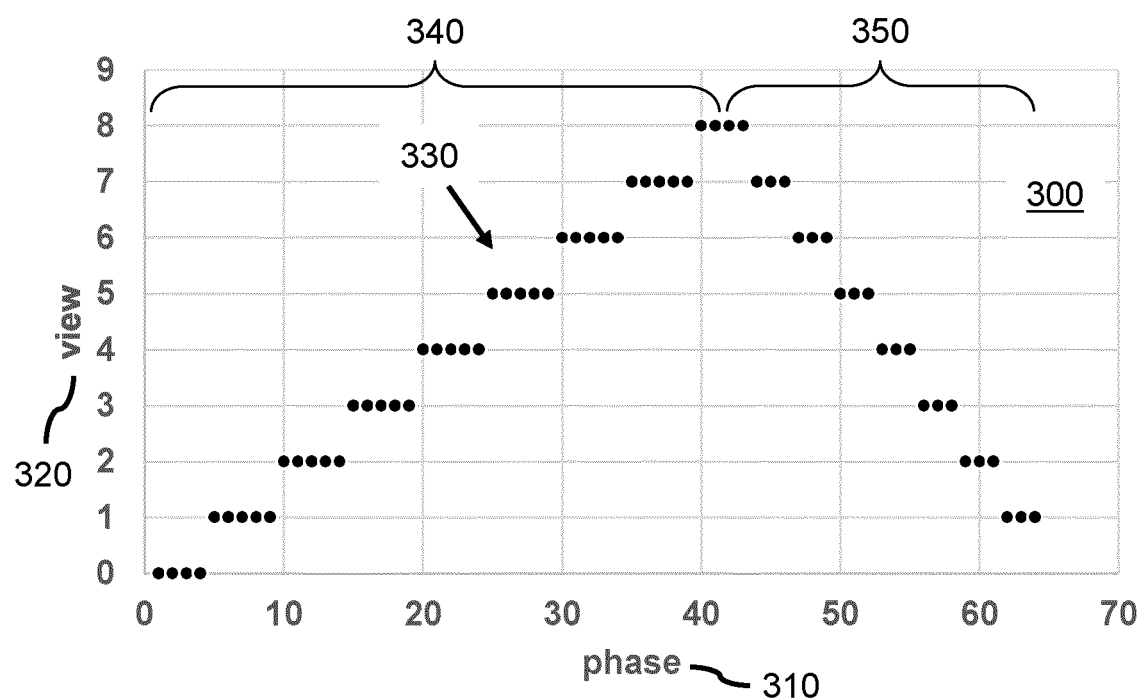
FIG. 3 illustrates a mapping of phase to view number in which the mapping provides a stereoscopic sequence of views and a pseudoscopic sequence of views.

An example for the phase-to-view mapping 300 for 64 phases is shown in FIG. 3, where the phase 310 is set out on the horizontal axis against the view number 320 on the vertical axis. As can be seen in FIG. 3, every view number is repeated three times in the pseudo-stereoscopic area 350, and 5 times in the stereoscopic area 330, with the outer views 0 and 8 being assigned 4 phases.

Rather than repeating views in the phase-to-view mapping, one may also use a fixed-point representation for view numbers and thus represent view numbers with an increased precision, e.g., with view number 1.5 representing an intermediate view between view 1 and 2, or in general, such views representing 'inter-view' positions. In such cases, interpolation may be applied to the image data of the neighboring views, e.g., views 1 and 2, to compute the image data to be displayed at such an inter-view position. Alternatively, the view rendering may be performed at a higher precision or 'on demand' for the inter-view direction of a display element.

The phase-to-view mapping may be generated and/or implemented in various ways. In general, a high bit precision, such as 16-bit, may be desirable for accurately accumulating the phase deltas over, for example, the 2160 lines and 3840 pixels of a 4K panel. However, only the most significant bits of the numerical representation of the determined phase may be needed to determine the view number, given that the phases are typically only mapped to a relatively small number of views.

A specific example may be the following. When a [h,v,t] approach is used which is up-scaled to t≈65215 (or slightly less), while allowing for t to be view distance adjusted to the range of 65025–65535 (or slightly less), then the value of the most significant byte of t (so discarding the least significant byte) is between 254 and 255, and the corresponding phases between 0 and 255. This yields enough precision for up to several tens of views. For a low number of views, even fewer phases are needed, as for example indicated in FIG. 3 where already many views are repeated in the phase-to-view mapping even for 6-bits of precision (64 phases). One may thus compute the phase-to-view mapping for each of the possible values for the upper bits of t and store these in a look-table. The variations in the value of the most significant byte of t due to view distance adjustment are only 1 in 256, so may be ignored.

Given the above, the phase-to-view mapping may be implemented as a look-up table using only the upper bits of the phase as index to the table.

Such a look-up table may be partly or entirely programmable, for example, using an external interface. An entirely programmable look-up table may enable arbitrary and/or 'exotic' phase-to-view mappings to be implemented, for example, which deviate from linear stereoscopic and pseudo-stereoscopic phase-to-view relations. Another example is that a limited number of pre-programmed look-up tables may be implemented which may be selectable, e.g., at manufacture or during use (at run-time). A look-up table may also allow fractional view numbers to be programmed. Another example is that the look-up table may only be programmed with values that directly correspond to integer view numbers, e.g., with all fractional bits set to 0.

With further reference to the look-up table, one may consider that the most-significant bits of the phase may be used to index the look-up table to determine the view number for a particular display element, and that the remaining bits are not used for determining the view number. In another embodiment, one may distinguish between three classes: the upper-most bits of the numerical representation of the phase which may be are used as index to the look-up table, the lower-most bits that are not used to determine the view number, and the remaining bits in-between. These 'intermediate' bits may be used to interpolate between the neighboring entries in the phase-to-view table. For example, if the upper-most bits indicate that view 4 is to be indexed, and the intermediate bits indicate a fraction $\frac{3}{4}$, then (when using linear interpolation), $\frac{3}{4}$ of the phase-to-view entry at index 5 may be added to $\frac{1}{4}$ of the phase-to-view entry at index 4 to arrive at the view number. Next to linear interpolation, also higher-order interpolation may be used to interpolate between the entries containing view numbers in the look-up table, for example using splines as known per se in the art. In a particular embodiment of this approach, the look-table may be implemented as a 1D texture map, and texture units of the processor system may be configured to perform interpolation when retrieving the view number for the phase corresponding to each subpixel.

It is noted that the above refers to 'bits' but may equally apply to any type of numerical digits of a particular numerical representation of the phase.

Processor System and Computer-Implemented Method

The above-described embodiments may be carried out by means of an appropriately configured processor system. FIG. 1 shows such a processor system as an external component providing interleaved image data to the 3D display.

FIG. 4 shows an alternative to FIG. 1, in which the processor system 120 is implemented in the form of an internal component of the 3D display 140 internally outputting data 122 of the interleaved output image. FIG. 4 also shows internal components of the processor system 120, such as the processor 130 and the memory 135. Non-cited reference numerals in FIG. 4 correspond to those of FIG. 1. Although not shown explicitly in FIGS. 1 and 4, the processor system 120 may also have an interface for allowing the horizontal delta h, the vertical delta v and/or the total number of phases t to be externally configured, and/or the sub-pixel offsets. Such an interface may take various forms, such as electrical interfaces such as I2C and RS232, software interfaces such as software APIs (Application Programming Interfaces), or the combination of both. For example, the interface may be a software API for a driver, which may then communicate via 120 to set values in hardware registers that correspond to the different items. Additionally or alternatively, such an interface may allow the values of the pitch distance p and the slant angle s to be externally configured, with the processor system then determining values of the horizontal delta h, the vertical delta v and/or the total number of phases t based on the values of p and s.

It will be appreciated that the processor system 120 may not need to interleave image data and output the interleaved output image. Rather, embodiments are conceived where the processor system 120 assigns the view numbers and where another entity interleaves the image data based on the assigned view numbers.

In general, the processor system may be embodied in or as a separate device, e.g., in or as a set-top box, personal computer, gaming console or similar device that is connectable to the 3D display. In general, the processor system may be implemented by a device or apparatus. The device or apparatus may comprise one or more (micro)processors which execute appropriate software. Software implementing the functionality of the function(s) may have been downloaded and/or stored in a corresponding memory or memories, e.g., in volatile memory such as RAM or in non-volatile memory such as Flash. Alternatively, the function(s) of the processor system may be implemented in the device or apparatus in the form of programmable logic, e.g., as a Field-Programmable Gate Array (FPGA), or as an Application-Specific Integrated Circuit (ASIC), or as any other type of circuit or combination of circuits.

FIG. 5 shows a computer-implemented method 400 of assigning view numbers to display elements of an autostereoscopic display for use in interleaving image data of different viewpoints of a scene on the basis of said assigned view numbers. The computer-implemented method 400 may, but does not need to, correspond to an operation of the processor system 120 as described with reference to FIG. 1, 4 and others. The method 400 may comprise, in a step titled "DETERMINING PHASE OF DISPLAY ELEMENT", determining 410 a phase for a respective display element to be used in the assignment of the view number, e.g., in a manner as described above. The method 400 may further comprise, in a step titled "DETERMINING VIEW NUMBER FROM DETERMINED PHASE", determining 420 the view number from said determined phase, e.g., in a manner as described above.

The method 400 may be implemented on a processor system, e.g., on a computer as a computer implemented method, as dedicated hardware, or as a combination of both. As also illustrated in FIG. 6, instructions for the computer, e.g., executable code, may be stored on a computer readable medium 450, e.g., in the form of a series 460 of machine readable physical marks and/or as a series of elements having different electrical, e.g., magnetic, or optical properties or values. The executable code may be stored in a transitory or non-transitory manner. Examples of computer readable mediums include memory devices, optical storage devices, integrated circuits, servers, online software, etc. FIG. 6 shows an optical disc 450.

In another embodiment, the computer readable medium 450 may comprise the look-up table as described above as transitory or non-transitory data.

It should be noted that the above-mentioned embodiments illustrate rather than limit the invention, and that those skilled in the art will be able to design many alternative embodiments.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. Expressions such as "at least one of" when preceding a list or group of elements represent a selection of all or of any subset of elements from the list or group. For example, the expression, "at least one of A, B, and C" should be understood as including only A, only B, only C, both A and B, both A and C, both B and C, or all of A, B, and C. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A computer-implemented method of assigning view numbers to display elements of an autostereoscopic display for use in interleaving image data of different viewpoints of a scene on the basis of said assigned view numbers, the autostereoscopic display comprising:

a display panel comprising an array of display elements; and an array of elongated optical elements for redirecting light emitted by the display elements in mutually different directions, the optical elements being arranged substantially in parallel at a pitch distance p and oriented with their main longitudinal axis at a slant s to a column direction of the array of display elements, the method comprising:

determining a phase for a respective display element to be used in the assignment of the view number, wherein the phase is representative of a relative horizontal position of the respective display element with respect to an optical element redirecting the light emitted by the respective display element and is thereby indicative of a direction in which the light is redirected, wherein the phase is determined as a delta with respect to the phase of a preceding display element at a horizontal position x and a vertical position y in the array of display elements in accordance with:

$$\text{phase}(x+1,y) = (\text{phase}(x,y) + h) \% t$$

$$\text{phase}(x,y+1) = (\text{phase}(x,y) + v) \% t$$

wherein h represents a horizontal delta in phase per display element, wherein v represents a vertical delta in phase per display element, wherein t represents a total number of phases and wherein % is a functional representation of a modulo operation, wherein values of h, v and t are selected as integer values which approximate the pitch distance p and the slant s in accordance with $$p \approx \left|\frac{t}{h}\right| \text{ and } s \approx \frac{v}{h}$$

so that the approximation error in the phase over the width and height of the array of display elements accumulates to less than the pitch distance p; and determining the view number from said determined phase based on a number of most significant digits of a numerical representation of the phase.

2. The method according to claim 1, further comprising selecting the values of h, v and t by:

approximating the pitch distance p and the slant s as rational numbers having a common denominator;

determining the value of h as being the common denominator;

determining the value of v by multiplying s by h and rounding a result of said multiplication to obtain an integer value for v; and determining the value of t by multiplying p by h and rounding a result of said multiplication to obtain an integer value for t.

3. The method according to claim 1, further comprising selecting the value of h, the value of v and the value of t so that a largest one of said values is a maximum value of the numerical representation of the phase.

4. The method according to claim 1, further comprising selecting the value of h, the value of v and the value of t so that a largest one of said values plus a headroom value equals the maximum value of the numerical representation of the phase, wherein the headroom value represents an allocation of a headroom with respect to the maximal value for allowing adjustments of t for adjusting for the view distance of a viewer to the autostereoscopic display.

5. The method according to any one of claim 1, wherein the display elements are pixels or group of pixels, wherein each pixel comprises a number of sub-pixels, and wherein the method further comprises assigning a sub-pixel phase to a respective sub-pixel by adding an offset to, or subtracting an offset from, the determined phase of the pixel or group of pixels.

6. The method according to any one of claim 1, wherein determining the view number from the determined phase comprises using the number of most significant digits of the numerical representation of the phase as an argument to a function providing a mapping from the determined phase to the view number, for example as an index to a look-up table.

7. The method according to claim 6, wherein the look-up table defines, for increasing phases, a stereoscopic sequence of views in which the view numbers increase and a pseudoscopic sequence of views in which the view numbers decrease.

8. The method according to claim 6, wherein the look-up table contains integer representations of the view numbers.

9. The method according to claim 6, further comprising selecting the look-up table from a number of look-up tables, each look-up table providing a different mapping from the determined phase to the view number.

10. The method according to claim 1, further comprising adjusting for the view distance of a viewer to the autostereoscopic display by adjusting the value of t.

11. A computer readable medium comprising transitory or non-transitory data representing instructions for a processor system to perform the method according to any claim 1.

12. A non-transitory computer readable medium comprising data representing the look-up table according to claim 6.

13. A processor system for assigning view numbers to display elements of an autostereoscopic display for use in interleaving image data of different viewpoints of a scene on the basis of said assigned view numbers, the autostereoscopic display comprising:

a display panel comprising an array of display elements; and an array of elongated optical elements for redirecting light emitted by the display elements in mutually different directions, the optical elements being arranged substantially in parallel at a pitch distance p and oriented with their main longitudinal axis at a slant s to a column direction of the array of display elements, the processor system comprising:

a memory comprising instruction data representing a set of instructions;

a processor configured to communicate with the memory and to execute the set of instructions, wherein the set of instructions, when executed by the processor, cause the processor to determine a phase for a respective display element to be used in the assignment of the view number, wherein the phase is representative of a relative horizontal position of the respective display element with respect to an optical element redirecting the light emitted by the respective display element and is thereby indicative of a direction in which the light is redirected, wherein the phase is determined as a delta with respect to the phase of a preceding display element at a horizontal position x and a vertical position y in the array of display elements in accordance with:

phase(x+1,y)=(phase(x,y)+h)% t phase(x,y+1)=(phase(x,y)+v)% t wherein h represents a horizontal delta in phase per display element, wherein v represents a vertical delta in phase per display element, wherein t represents a total number of phases and wherein % is a functional representation of a modulo operation, wherein values of h, v and t are selected as integer values which approximate the pitch distance p and the slant s in accordance with $$p \approx \left|\frac{t}{h}\right| \text{ and } s \approx \frac{v}{h}$$

so that the approximation error in the phase over the width and height of the array of display elements accumulates to less than the pitch distance p; and determine the view number from said determined phase based on a number of most significant digits of a numerical representation of the phase.

14. The system according to claim 13, further comprising a configuration interface for enabling the value of the horizontal delta h, the vertical delta v and/or the total number of phases t to be externally configured.

15. The system according to claim 13, further comprising a configuration interface for enabling the values of the pitch distance p and the slant s to be externally configured, wherein the set of instructions, when executed by the processor, cause the processor determine the values of the horizontal delta h, the vertical delta v and/or the total number of phases t based on the values of p and s.

* * * * *